United States Patent
Neville

(10) Patent No.: US 12,302,924 B2
(45) Date of Patent: May 20, 2025

(54) FROZEN CONFECTION

(71) Applicant: Conopco, Inc., Englewood Cliffs, NJ (US)

(72) Inventor: Michelle Elizabeth Neville, Bedford (GB)

(73) Assignee: Conopco, Inc., Hoboken, NJ (US)

( * ) Notice: Subject to any disclaimer, the term of this patent is extended or adjusted under 35 U.S.C. 154(b) by 426 days.

(21) Appl. No.: 17/764,361

(22) PCT Filed: Sep. 28, 2020

(86) PCT No.: PCT/EP2020/077070
§ 371 (c)(1),
(2) Date: Mar. 28, 2022

(87) PCT Pub. No.: WO2021/063871
PCT Pub. Date: Apr. 8, 2021

(65) Prior Publication Data
US 2022/0361523 A1   Nov. 17, 2022

(30) Foreign Application Priority Data

Oct. 1, 2019  (EP) .................................. 19200918

(51) Int. Cl.
A23G 9/38  (2006.01)
A23G 9/42  (2006.01)

(52) U.S. Cl.
CPC ................ A23G 9/38 (2013.01); A23G 9/42 (2013.01)

(58) Field of Classification Search
CPC .................................... A23G 9/38; A23G 9/42
See application file for complete search history.

(56) References Cited

U.S. PATENT DOCUMENTS

| | | |
|---|---|---|
| 6,299,914 B1 | 10/2001 | Christiansen et al. |
| 2014/0030416 A1 | 1/2014 | Sabbagh |
| 2018/0160703 A1 | 6/2018 | Wix et al. |
| 2018/0360070 A1 | 12/2018 | McIntosh |

FOREIGN PATENT DOCUMENTS

| | | |
|---|---|---|
| BR | 102017026823 | 6/2019 |
| CN | 101416677 | 4/2009 |
| CN | 102870951 | 3/2014 |
| CN | 107734974 | 6/2016 |
| CN | 10600973 | 6/2017 |
| CN | 107028193 | 8/2017 |
| EP | 2161029 | 3/2010 |
| KR | 102008005105 | 6/2008 |
| WO | WO2017001267 | 1/2017 |
| WO | WO2017160984 | 9/2017 |

OTHER PUBLICATIONS

Search Report and Written Opinion in EP19200918; Apr. 17, 2020.
Gorissen et al; Amino Acids; Protein content and amino acid composition of commercially available plant-based protein isolates ; Aug. 30, 2018; 1685-1695; 50.
Search Report and Written Opinion in PCTEP2020077070; Dec. 8, 2020.
IPRP2 in PCTEP2020077070; Sep. 16, 2021.

*Primary Examiner* — Katherine D Leblanc
(74) *Attorney, Agent, or Firm* — Gerard J. McGowan, Jr.

(57) ABSTRACT

A frozen confection comprising freezing point depressant in an amount of 1 to 30 wt %, pulse protein in an amount of 0.4 to 10 wt % and lysine, wherein the weight ratio of plant protein to lysine is from 3:1 to 8:1.

9 Claims, 1 Drawing Sheet

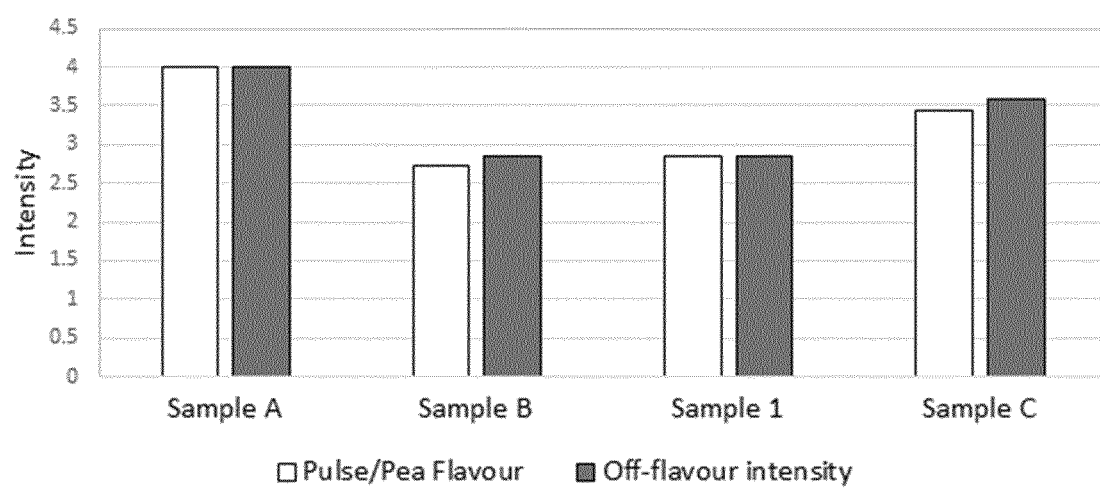

FROZEN CONFECTION

FIELD OF THE INVENTION

The present invention relates to frozen confections, in particular frozen confections comprising pulse protein.

BACKGROUND OF THE INVENTION

Many adults suffer from lactose intolerance and are unable to digest lactose, which is the main sugar found in dairy products. In addition, plant-based foods are a growing consumer trend, which is thought to be driven by increasing health and environmental consciousness. As a result, there is currently an increased consumer demand for frozen confections which are not based on dairy ingredients, and instead use plant-based alternatives.

Frozen confections where some or all of the dairy ingredients have been replaced with plant-based ingredients are commercially available. For example, pulse protein (such as soy protein or pea protein) is becoming more widely used in frozen confections. However, the flavour and texture of frozen confections formulated with pulse protein is still unappealing to some consumers. In particular, their widespread acceptance is hindered by issues around their off-flavour, and pulse proteins have an inherent taste that formulators must mask in order to create a neutral product base.

Commercially available non-dairy frozen confections such as Swedish Glace (formulated using soy protein) or Vegan Magnum (formulated using pea protein) currently contain a small amount of sodium chloride (i.e. salt) as a taste modulator. However, health conscious consumers are often looking to decrease their salt intake and would prefer to buy products which do not include salt on the ingredient list.

Therefore, it would be advantageous to find an alternative taste modulator which masks the off-flavour of pulse proteins.

SUMMARY OF THE INVENTION

We have found that incorporating lysine into frozen confections comprising pulse proteins can improve their taste in a similar manner to sodium chloride (a source of sodium ions, which are a known taste modulator). Furthermore, we have found that the amount of lysine relative to the amount of pulse protein must be controlled within certain limits in order for this effect to be perceived. Therefore, the present invention relates to a frozen confection comprising:
 freezing point depressant in an amount of 1 to 30 wt %;
 pulse protein in an amount of 0.4 to 10 wt %; and
 lysine,
 wherein the weight ratio of pulse protein to lysine is from 3:1 to 8:1.

DETAILED DESCRIPTION OF THE INVENTION

The present invention relates to a frozen confection. As used herein the term frozen confection means a confection intended for consumption in the frozen state (i.e. where the temperature of the confection is less than 0° C., and preferably wherein the confection comprises significant amounts of ice). Examples of frozen confections include ice creams, sherbets, sorbets, granitas, and water ices. Preferably the frozen confection is a non-dairy ice cream, or a water ice.

Definitions and descriptions of various terms and techniques used in frozen confection manufacture are found in Ice Cream by H. Douglas Goff and Richard W. Hartel (2013, 7$^{th}$ Edition, Kluwer Academic/Plenum Publishers). All percentages contained herein are calculated by weight (unless otherwise indicated), with the exception of percentages cited in relation to overrun.

The frozen confection comprises pulse protein in an amount of 0.4 wt % to 10 wt %. The pulse protein is preferably selected from: bean protein, lentil protein, lupin protein, pea protein, soy protein, and mixtures thereof. For example, the pulse protein may comprise pea protein, soy protein, or a mixture thereof. It is particularly preferred that the pulse protein is pea protein.

Since high levels of pulse protein are associated with undesirable mouthfeel characteristics (such as grittiness), it is preferred that the frozen confection comprises the pulse protein in an amount of 8 wt % or less, 6 wt % or less, 5 wt % or less, or even 4 wt % or less. The frozen confection preferably comprises the pulse protein in an amount of at least 0.5 wt %, at least 0.6 wt %, at least 0.8 wt % or even at least 1 wt %.

The frozen confection comprises lysine. As used herein lysine refers to the amino acid monomer, and does not include polypeptides or proteins which include lysine as a component residue. Lysine may be incorporated in the frozen confection as a free amino acid or in the form of a salt. Where a lysine salt is used, it is only the contribution of the lysine that is used when calculating the amount of lysine in the formulation. For example, a preferred source of lysine is lysine HCl; 1 g of lysine HCl provides 0.8 g of lysine (since lysine HCl is 80 wt % lysine and 20 wt % HCl).

The relative amounts of pulse protein and lysine must be controlled in order to achieve the desired taste modulation. Therefore, the weight ratio of pulse protein to lysine is from 3:1 to 8:1, preferably from 3:1 to 7:1, more preferably from 7:2 to 6:1.

The amount of lysine in the frozen confection is less important than the ratio of pulse protein to lysine. For example, the frozen confection may comprise lysine in an amount of 0.2 wt % to 1 wt %, 0.25 wt % to 0.8 wt %, or 0.3 wt % to 0.75 wt %.

As set out above the frozen confection comprises pulse protein. However, it is possible for the frozen confection to additionally comprise other sources of protein in addition to the pulse protein. For example, the frozen confection may additionally comprise cereal protein (such as oat protein, wheat protein, rye protein, barley protein, rice protein, buckwheat protein, millet protein and mixtures thereof).

It is also possible for the frozen confection to additionally comprise milk protein, although it is preferred that the frozen confection is substantially free of dairy ingredients including milk protein. As used herein "substantially free of" means that the frozen confection comprises the ingredient in question in an amount of less than 0.1 wt %, preferably less than 0.05 wt %, more preferably less than 0.01 wt %.

The frozen confection comprises freezing point depressant in an amount of 1 wt % to 30 wt %. High concentrations of freezing point depressant may contribute unwanted sweetness and or calories to the frozen confection. Therefore, the amount of freezing point depressant in the frozen confection is preferably no more than 28 wt %, no more than 25 wt %, or no more than 22 wt %. Conversely, low concentrations of freezing point depressant may be inappropriate if the frozen confection is a scoopable product, since a low concentration of freezing point depressant tends to result in frozen confections with a high ice content. Therefore, the amount of freezing point depressant in the frozen confection is preferably at least 3 wt %, at least 5 wt %, at least 7 wt %, or at least 10 wt %. Preferably the freezing point depressant consists of monosaccharides, disaccharides, oligosaccharides, sugar alcohols, and mixtures thereof. Most preferably the freezing point depressant is selected from the group consisting of monosaccharides, disaccharides, oligosaccharides formed from 3 to 10 monosaccharide monomers, erythritol, arabitol, glycerol, xylitol, sorbitol, mannitol, lactitol, maltitol, and mixtures thereof. It is preferred that the frozen confection is substantially free of dairy ingredients, thus it is preferred that the freezing point depressant(s) are substantially free of lactose.

The frozen confection may comprise non-nutritive sweetener, such as aspartame, acesulfame K, erythritol, or one or more steviol glycosides such as rebaudioside A.

The frozen confection preferably comprises from 1 wt % to 15 wt % fat, more preferably from 4 wt % to 12 wt %, most preferably from 5 wt % to 10 wt %.

The frozen confection preferably comprises an emulsifier or a mixture of emulsifiers such as mon-diglycerides and the like. For example, the frozen confection may comprise emulsifier in an amount of 0.05 wt % to 1 wt %, 0.1 wt % to 0.8 wt %, or 0.2 wt % to 0.5 wt %.

Although not essential, the frozen confection typically comprises at least one stabiliser, which is preferably selected from the group consisting of locust bean gum, xanthan gum, guar gum, carrageenan, and mixtures thereof (for example, a mixture of locust bean gum and guar gum). The amount of stabiliser in the frozen confection is preferably 0.05 wt % to 2 wt %, 0.1 wt % to 1 wt %, or 0.2 wt % to 0.5 wt %.

The frozen confection is preferably aerated. As used herein the term "aerated" means that the confection has an overrun of at least 30%. Preferably the frozen confection has an overrun of 50% to 150%, 70% to 140%, or even 80% to 120%. Overrun (with unit "%") is defined by the following equation:

$$\text{overrun} = \frac{\text{volume of aerated product} - \text{volume of initial mix}}{\text{Volume of initial mix}} \times 100\%$$

Overrun is measured at ambient temperature (20° C.) and atmospheric pressure.

The frozen confections of the present invention can be manufactured by any suitable method. The frozen confection is typically made by freezing a premix (preferably a pasteurised premix) of ingredients such as water, fat, freezing point depressant, protein (comprising the pulse protein), and optionally other ingredients such as emulsifiers, stabilisers, colours and flavours.

Unless otherwise specified, numerical ranges expressed in the format "from x to y" are understood to include x and y, and in specifying any range of values or amounts, any particular upper value or amount can be associated with any particular lower value or amount.

Except in the examples and comparative experiments, or where otherwise explicitly indicated, all numbers are to be understood as modified by the word "about". As used herein, the indefinite article "a" or "an" and its corresponding definite article "the" means at least one, or one or more, unless specified otherwise.

FIGURES

By way of example, the present invention is illustrated with reference to the following figures, in which:

FIG. 1 is a graphical representation of the organoleptic assessments described in Example 1.

EXAMPLES

The following examples are intended to illustrate the invention and are not intended to limit the invention to those examples per se.

Ingredients

Ingredients (and suppliers) were as follows:

Pea protein—83% protein content (Nutralys S85F-Roquette)

Coconut oil (Cargill Inc)

Lysine HCl (CJ Cheiljedang)

NaCl (Brenntag)

Sucrose (British Sugar)

Stabiliser: Locust bean gum (LBG)/guar gum (Danisco)

Emulsifier: mono- and di-glycerides of fatty acids (Danisco)

Example 1

Non-dairy ice creams were made according to the formulations in Table 1. The specified protein content (P) is the amount of pea protein provided by the Nutralys S85F (i.e. 1 g of Nutralys S85F provides 0.83 g protein, since the protein content of Nutralys is 83 wt %). The specified lysine content (L) is the amount of lysine provided by the lysine HCl (e.g. 1 g of lysine HCl provides 0.8 g of lysine, since lysine HCl is 80 wt % lysine and 20 wt % HCl).

TABLE 1 non-dairy ice cream formulations

| Ingredient (wt %) | Sample A | B | C | 1 |
|---|---|---|---|---|
| Coconut oil | 5 | 5 | 5 | 5 |
| Pea protein | 2.5 | 2.5 | 2.5 | 2.5 |
| Sucrose | 18 | 18 | 18 | 18 |
| Lysine HCl | — | — | 1 | 0.5 |
| NaCl | — | 0.15 | — | — |
| Stabiliser | 0.3 | 0.3 | 0.3 | 0.3 |
| Emulsifier | 0.3 | 0.3 | 0.3 | 0.3 |
| Water | to 100 | to 100 | to 100 | to 100 |
| Pulse protein (P) | 2.075 | 2.075 | 2.075 | 2.075 |
| Lysine (L) | — | — | 0.8 | 0.4 |
| (P):(L) | N/A | N/A | 2.6:1 | 5.2:1 |

Process

Dry ingredients (i.e. sucrose, lysine HCl (where present), NaCl (where present), stabiliser and emulsifier) were mixed together and then dispersed in water with mixing at 3000 rpm for 2 min. The pea protein was added, followed by mixing at 8000 rpm for 2 min. Finally, the coconut oil was added with further mixing at 8000 rpm for 5 min carried out, after which the temperature was raised to 79° C. and the mix pasteurised for 2 seconds.

The resultant mix was homogenised at 400 bar, and the homogenised mix was then cooled in a fridge for about 12 hours, before being frozen for 20 minutes in a Taylor 104 benchtop scraped surface freezer with an overrun of around 43%.

Organoleptic Properties

Organoleptic assessments were carried out on Sample A, Sample B, Sample C and Sample 1. In these assessments, 7 experienced tasters consumed each of the samples and gave scores (on a scale of 0 to 7) for the pea/pulse flavour and the off-flavour intensity of the non-dairy ice creams (served at −18° C.). The results are shown in FIG. 1, where the white bars represent the pea/pulse flavour intensity and the grey bars represent the off-flavour intensity.

As can be seen from the results in FIG. 1, Sample A (no taste modulator) was found to have the highest intensities of both pulse/pea flavour and off-flavour intensity. As expected, Sample B (representative of current commercially available non-dairy frozen confections containing a small amount of NaCl as a taste modulator) had significantly lower intensities of both pulse/pea flavour and off-flavour compared to Sample A. Sample 1 (weight ratio of pulse protein to lysine=5.2:1) was found to have intensities of both pulse/pea flavour and off-flavour similar to those of Sample B. However, Sample C (weight ratio of pulse protein to lysine=2.6:1) was found to have higher intensities of both pulse/pea flavour and off-flavour than Sample B.

The invention claimed is:

1. A frozen confection comprising:
freezing point depressant in an amount of 1 to 30 wt %;
pulse protein in an amount of 0.4 to 10 wt %; and
lysine monomer,
wherein the weight ratio of pulse protein to lysine monomer is from 3:1 to 8:1.

2. The frozen confection as claimed in claim 1 comprising pulse protein in an amount of 0.5 to 8 wt %.

3. The frozen confection as claimed in claim 1 wherein the weight ratio of pulse protein to lysine monomer is 3:1 to 7:1.

4. The frozen confection as claimed in claim 3 wherein the weight ratio of pulse protein to lysine monomer is 7:2 to 6:1.

5. The frozen confection as claimed in claim 1 wherein the pulse protein is selected from: bean protein, lentil protein, lupin protein, pea protein, soy protein, and mixtures thereof.

6. The frozen confection as claimed in claim 5 wherein the pulse protein comprises pea protein, soy protein, or a mixture thereof.

7. The frozen confection as claimed in claim 5 wherein the pulse protein is pea protein.

8. The frozen confection as claimed in claim 1 comprising lysine monomer in an amount of 0.2 to 1 wt %.

9. The frozen confection as claimed in claim 1 wherein the frozen confection additionally comprises cereal protein.

* * * * *